United States Patent
Kakiuchi et al.

(10) Patent No.: US 7,815,543 B2
(45) Date of Patent: Oct. 19, 2010

(54) CREEP CONTROL DEVICE FOR VEHICLE

(75) Inventors: Hiroki Kakiuchi, Wako (JP); Yoshinori Tanaka, Wako (JP); Yoshimichi Tsubata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 488 days.

(21) Appl. No.: 11/923,063

(22) Filed: Oct. 24, 2007

(65) Prior Publication Data

US 2008/0125287 A1 May 29, 2008

(30) Foreign Application Priority Data

Nov. 24, 2006 (JP) ............................. 2006-316927

(51) Int. Cl.
*F16H 61/58* (2006.01)
*B60W 10/02* (2006.01)

(52) U.S. Cl. .................... 477/62; 477/176; 477/901; 477/904

(58) Field of Classification Search ............ 477/54, 477/62, 64, 175, 176, 180, 901, 904
See application file for complete search history.

(56) References Cited

U.S. PATENT DOCUMENTS 5,743,829 A * 4/1998 Tanizawa et al. ............ 477/174
6,056,667 A * 5/2000 Sasaki ........................ 477/174
7,044,890 B2 * 5/2006 Kojima et al. ............... 477/175
7,530,924 B2 * 5/2009 Brevick ...................... 477/176
2006/0094564 A1 * 5/2006 Ilda et al. ...................... 477/62
2008/0182721 A1 * 7/2008 Saitou et al. ................ 477/176

FOREIGN PATENT DOCUMENTS

JP 2001-116067 A 4/2001
JP 2007192276 A * 8/2007

* cited by examiner

*Primary Examiner*—Roger Pang
(74) *Attorney, Agent, or Firm*—Westerman, Hattori, Daniels & Adrian, LLP (57) ABSTRACT

A creep control device for a vehicle having an automatic transmission including a torque converter with a lock-up clutch. The creep control device includes a throttle angle sensor for detecting a throttle angle, a vehicle speed sensor for detecting a running speed of the vehicle, a slope sensor for detecting a road surface slope, and a lock-up clutch engagement control unit for controlling the degree of engagement of the lock-up clutch. When the throttle angle is detected to be nearly zero by the throttle angle sensor and the running speed is detected to be vary small or zero by the vehicle speed sensor in the condition where the shift position is in a running range, the degree of engagement of the lock-up clutch is controlled to decrease with an increase in the road surface slope by the lock-up clutch control unit.

2 Claims, 9 Drawing Sheets

CREEP CONTROL DEVICE FOR VEHICLE

BACKGROUND OF THE INVENTION

1. Field of the Invention

The present invention relates to a creep control device for a vehicle for controlling the degree of engagement of a lock-up clutch provided in a torque converter for an automatic transmission when the throttle angle is nearly zero, the vehicle is in a substantially stopped condition, and the shift position is in a running range, thereby controlling the creep torque to be transmitted to wheels.

2. Description of the Related Art

In an automatic transmission having a torque converter, the torque from the torque converter driven by engine idling is transmitted to wheels even when the throttle is fully closed in a running range, thus allowing creep running. In the condition where the vehicle is kept stopped by depressing a brake pedal, the creep torque is unnecessary. Accordingly, in this case, the engine consumes a redundant amount of fuel corresponding to the amount for producing the creep torque, causing a reduction in fuel economy. Further, there arises another problem such that unpleasant engine vibrations are produced in association with an increase in engine load.

Various creep control devices for a vehicle having an automatic transmission have conventionally been proposed to reduce the fuel consumption by partially engaging a lock-up clutch provided in a torque converter in the condition that the shift position is in a running range, that the throttle is fully closed, and that the vehicle is kept stopped or substantially stopped, thereby reducing the load on the engine during idling. For example, Japanese Patent Laid-open No. 2001-116067 discloses a creep control device for a clutch in a vehicle having an automatic transmission capable of performing creep running, wherein two strong and weak creep forces are set and the degree of engagement of the clutch provided in a power transmitting system for transmitting engine power to wheels is controlled to thereby switch between these strong and weak creep forces.

In this creep control device, the clutch is controlled to produce the weak creep torque in the condition where the vehicle is kept stopped by depressing a brake pedal (which control will be hereinafter referred to as weak creep control), thereby allowing a reduction in fuel consumption corresponding to the redundant creep torque produced in the case where no creep torque is required. Further, in the case that the slope of a road surface on which the vehicle is running is greater than or equal to a predetermined value, the weak creep control is not performed to thereby prevent minute backward movement of the vehicle at starting on the upward sloping road surface.

However, in the creep control device disclosed in Japanese Patent Laid-open No. 2001-116067, a redundant creep force is produced on a road surface having a slope range between a lower slope where the weak creep control is inhibited and a higher slope where the strong creep torque becomes a necessary and sufficient torque for prevention of the minute backward movement of the vehicle at starting. Accordingly, an unnecessary amount of fuel corresponding to this redundant creep force is consumed.

SUMMARY OF THE INVENTION

It is therefore an object of the present invention to provide a creep control device for a vehicle which can improve the fuel economy by controlling a creep force according to a road surface slope.

In accordance with an aspect of the present invention, there is provided a creep control device for a vehicle having an automatic transmission including a torque converter with a lock-up clutch, the creep control device including throttle angle detecting means for detecting a throttle angle; vehicle speed detecting means for detecting a running speed of the vehicle; slope detecting means for detecting a road surface slope; and lock-up clutch engagement control means for controlling the degree of engagement of the lock-up clutch; wherein when the throttle angle is detected to be nearly zero by the throttle angle detecting means and the running speed is detected to be very small or zero by the vehicle speed detecting means in the condition where the shift position is in a running range, the lock-up clutch is engaged in its slip condition and the degree of engagement of the lock-up clutch is controlled to decrease with an increase in the road surface slope by the lock-up clutch engagement control means.

According to the present invention, when the throttle angle is nearly zero (i.e., the throttle is in an almost fully closed condition) and the vehicle is in a substantially stopped condition in the running range, the degree of engagement of the lock-up clutch is controlled to decrease (i.e., the degree of slip of the lock-up clutch is controlled to increase) with an increase in the slope of the road surface on which the vehicle is running, so that a necessary and sufficient start driving force can be provided according to the slope of the road surface. Accordingly, as compared with a conventional torque converter such that a start driving force is uniquely determined according to mechanical characteristics, a redundant start driving force can be removed to thereby reduce a fuel consumption.

Further, a moderate start driving force can be produced by the slip control of the lock-up clutch, so that it is possible to reduce troublesomeness such that the operator must operate a brake pedal and an accelerator pedal at starting to minutely adjust a driving force. Accordingly, as compared with a vehicle having a general torque converter, the operability can be improved. Further, the frequency and degree of engine stall can be reduced by the slip control of the lock-up clutch at starting of the vehicle, so that it is possible to expect an effect such that a rise in engine oil temperature can be suppressed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
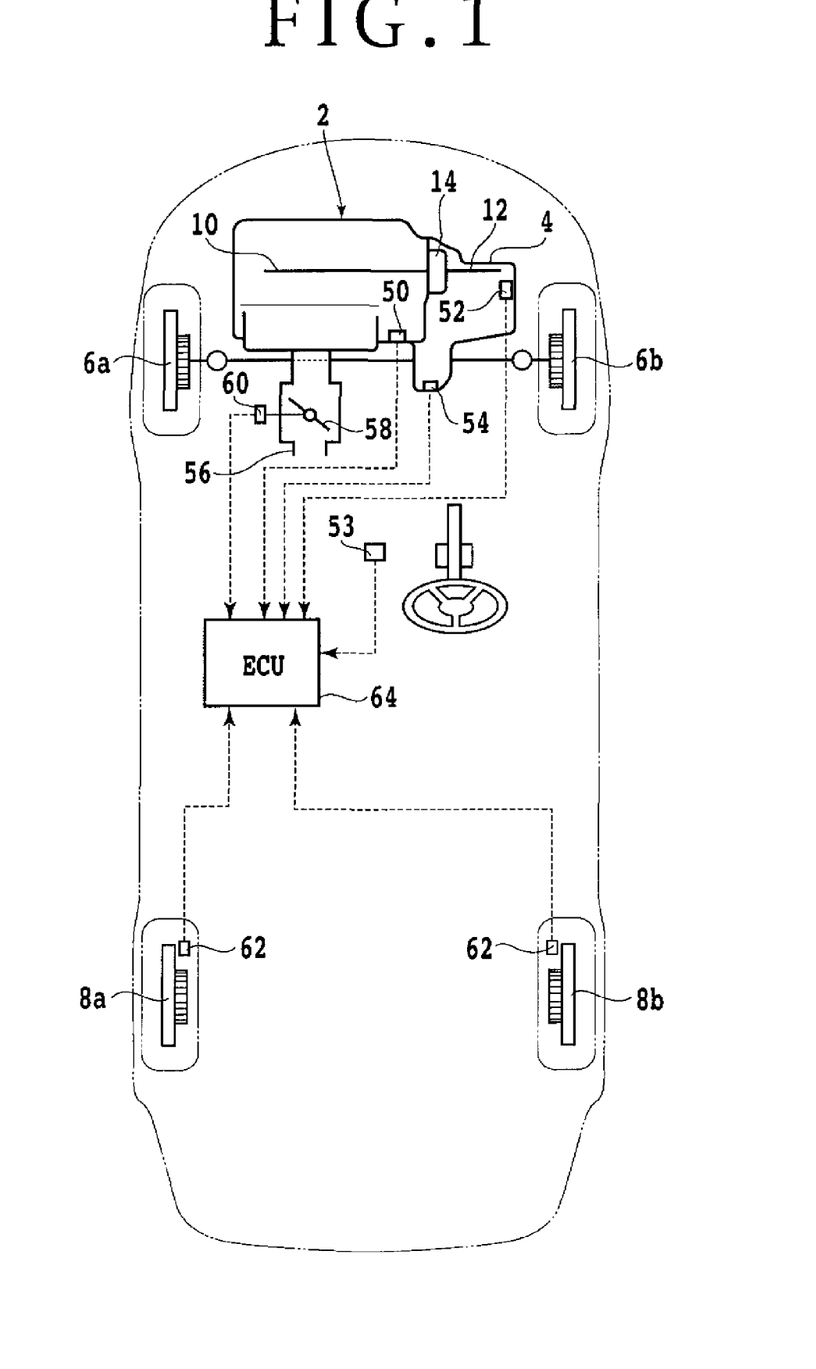
FIG. 1 is a schematic plan view showing a general configuration of a vehicle including the creep control device according to the present invention.
Figure 3:
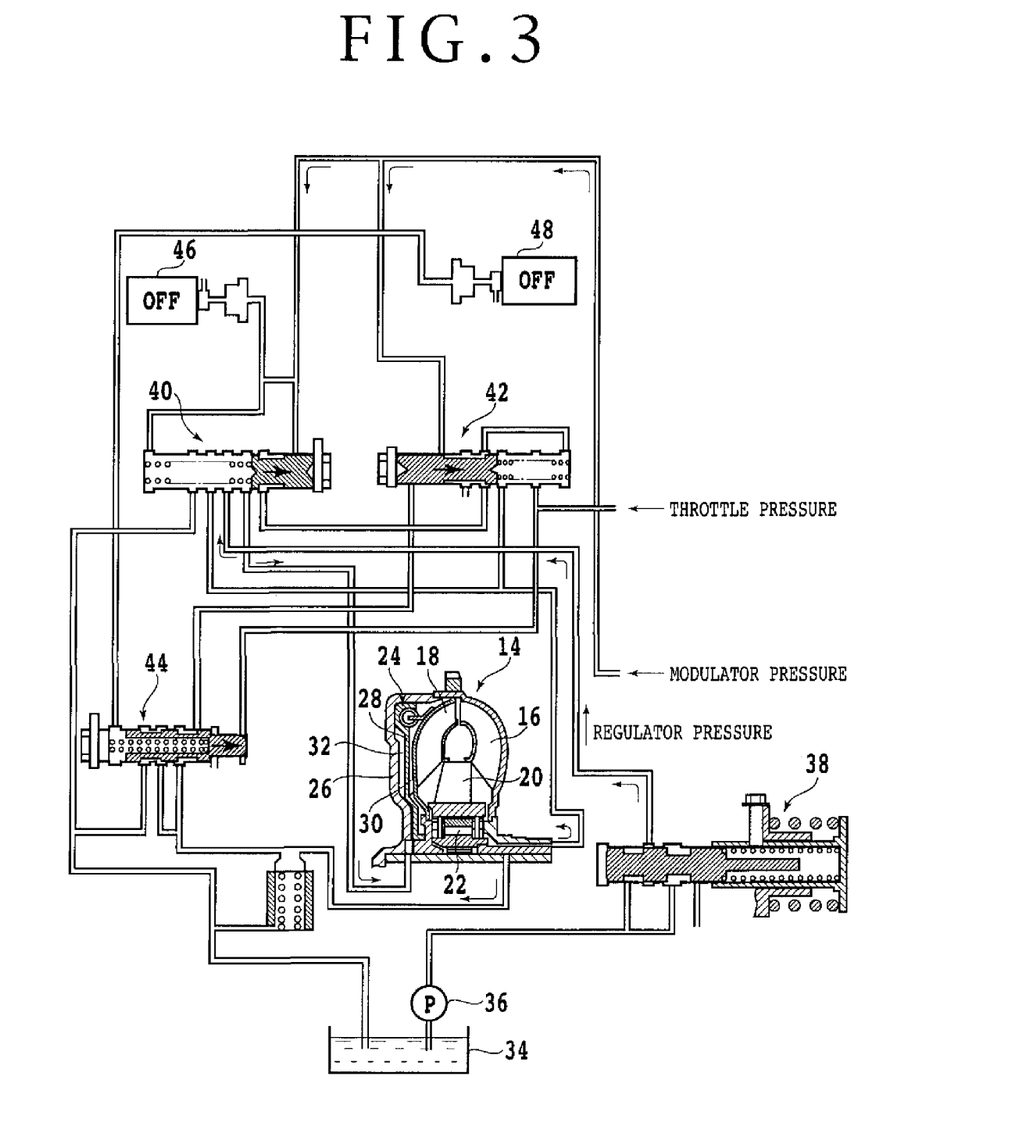
FIG. 3 is a hydraulic circuit diagram of a torque converter in disengaging a lock-up clutch.

FIG. 1 is a schematic plan view showing a general configuration of a vehicle including the creep control device according to the present invention. This vehicle is a front-wheel drive vehicle, which includes a pair of left and right drive wheels 6a and 6b to which the torque of an engine 2 is transmitted through an automatic transmission 4 and a pair of left and right driven wheels 8a and 8b rotating with running of the vehicle. A known torque converter 14 is interposed between a crankshaft 10 of the engine 2 and a main shaft 12 of the automatic transmission 4. As shown in FIG. 3, the torque converter 14 includes a pump impeller 16 connected to the crankshaft 10, a turbine runner 18 connected to the main shaft 12, a stator 20 supported through a one-way clutch 22 to a fixed portion, and a lock-up clutch 24 adapted to connect the pump impeller 16 and the turbine runner 18.

The lock-up clutch 24 includes a clutch piston 28 adapted to abut against the inner surface of a torque converter cover 26. A first oil chamber 30 and a second oil chamber 32 are formed on both sides of the clutch piston 28. When pressurized oil is supplied to the first oil chamber 30 to bring the clutch piston 28 into abutment against the torque converter cover 26, the lock-up clutch 24 is engaged to thereby transmit the torque of the crankshaft 10 directly to the main shaft 12. Conversely, when pressurized oil is supplied to the second oil chamber 32 to bring the clutch piston 28 into separation from the torque converter cover 26, the lock-up clutch 24 is disengaged to thereby break the mechanical connection between the crankshaft 10 and the main shaft 12.

Figure 4:
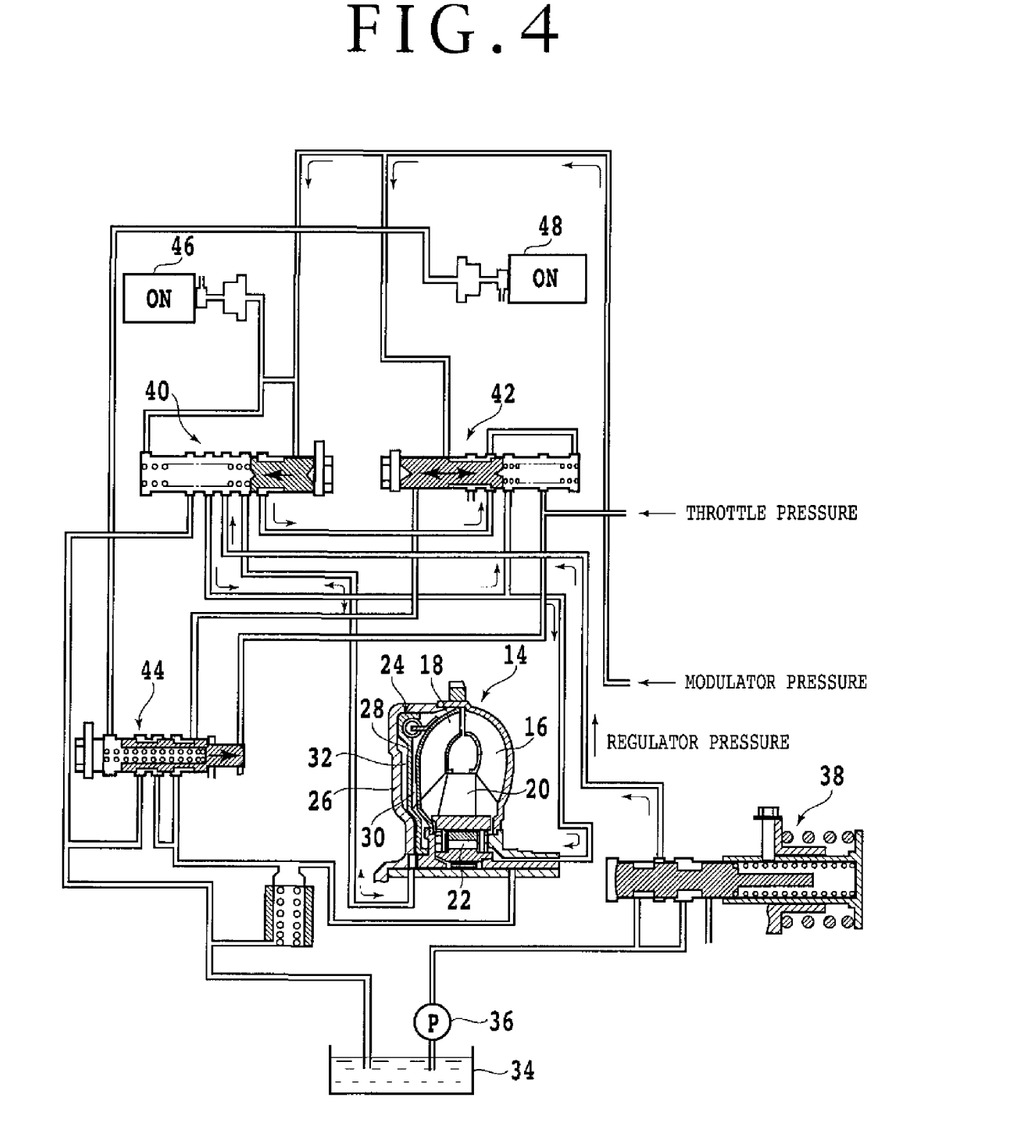
FIG. 4 is a hydraulic circuit diagram of the torque converter in engaging the lock-up clutch.

The hydraulic circuit of the torque converter 14 includes an oil pump 36 for pumping up a hydraulic fluid from an oil tank 34 and a regulator valve 38 for regulating the pressure of the hydraulic fluid from the oil pump 36 to a predetermined regulator pressure. A lock-up shift valve 40 functions to transmit the regulator pressure to the second oil chamber 32 of the torque converter 14 and to connect the first oil chamber 30 to the oil tank 34 when the lock-up clutch 24 is disengaged, whereas functions to transmit the regulator pressure to the first oil chamber 30 of the torque converter 14 and to connect the second oil chamber 32 to a lock-up control valve 42 which will be hereinafter described when the lock-up clutch 24 is engaged.

The lock-up control valve 42 functions to relieve the pressure of the hydraulic fluid supplied from the second oil chamber 32 through the lock-up shift valve 40 and to thereby regulate the pressure in the second oil chamber 32, thereby controlling the engagement force of the lock-up clutch 24. A lock-up timing valve 44 is operated by a throttle pressure at a high vehicle speed to thereby operate the lock-up control valve 42, thereby making the second oil chamber 32 open to the atmosphere to fully engage the lock-up clutch 24.

A first solenoid valve 46 is an on/off controlled valve. When the first solenoid valve 46 is turned off, a modulator pressure is transmitted to the left end of the lock-up shift valve 40 to rightward move the spool of the lock-up shift valve 40, so that the regulator pressure is transmitted to the second oil chamber 32 of the torque converter 14, and the first oil chamber 30 is connected to the oil tank 34, thereby disengaging the lock-up clutch 24.

When the first solenoid valve 46 is turned on, the modulator pressure is relieved to leftward move the spool of the lock-up shift valve 40, so that the regulator pressure is transmitted to the first oil chamber 30 of the torque converter 14, and the second oil chamber 32 is connected to the lock-up control valve 42, thereby engaging the lock-up clutch 24. A second solenoid valve 48 is a linear solenoid valve. When the second solenoid valve 48 is turned off, the modulator pressure is transmitted to the lock-up control valve 42 and the lock-up timing valve 44 to rightward bias the spool of the lock-up control valve 42 and the spool of the lock-up timing valve 44. When the second solenoid valve 48 is turned on, the modulator pressure is relieved to cancel the above-mentioned biasing force.

The degree of opening of the lock-up control valve 42 can be steplessly controlled by changing the value of a current supplied to the second solenoid valve 48. When the degree of opening of the lock-up control valve 42 is increased, the back pressure in the second oil chamber 32 of the torque converter 14 is decreased to thereby increase the engagement force of the lock-up clutch 24. Conversely, when the degree of opening of the lock-up control valve 42 is decreased, the back pressure in the second oil chamber 32 of the torque converter 14 is increased to thereby decrease the engagement force of the lock-up clutch 24.

Referring again to FIG. 1, the engine 2 is provided with engine speed detecting means 50 for detecting an engine speed Ne, and the automatic transmission 4 is provided with main shaft speed detecting means 52 for detecting a main shaft speed Nm and shift position detecting means 54 for detecting a shift position P. A throttle valve 58 is provided in an intake passage 56. The throttle valve 58 is provided with throttle angle detecting means 60 for detecting a throttle angle $\theta_{TH}$. Further, each of the rear wheels 8a and 8b as the driven wheels is provided with vehicle speed detecting means 62 for detecting a vehicle speed V. Reference numeral 53 denotes slope detecting means for detecting the slope of a road surface on which the vehicle is running. In this preferred embodiment, a G sensor for computing the slope from a longitudinal acceleration G of the vehicle is used as the slope detecting means 53. As a modification, the slope detecting means 53 may be provided by any means for directly detecting the angle of inclination of a vehicle body with respect to a horizontal plane.

Figure 2:
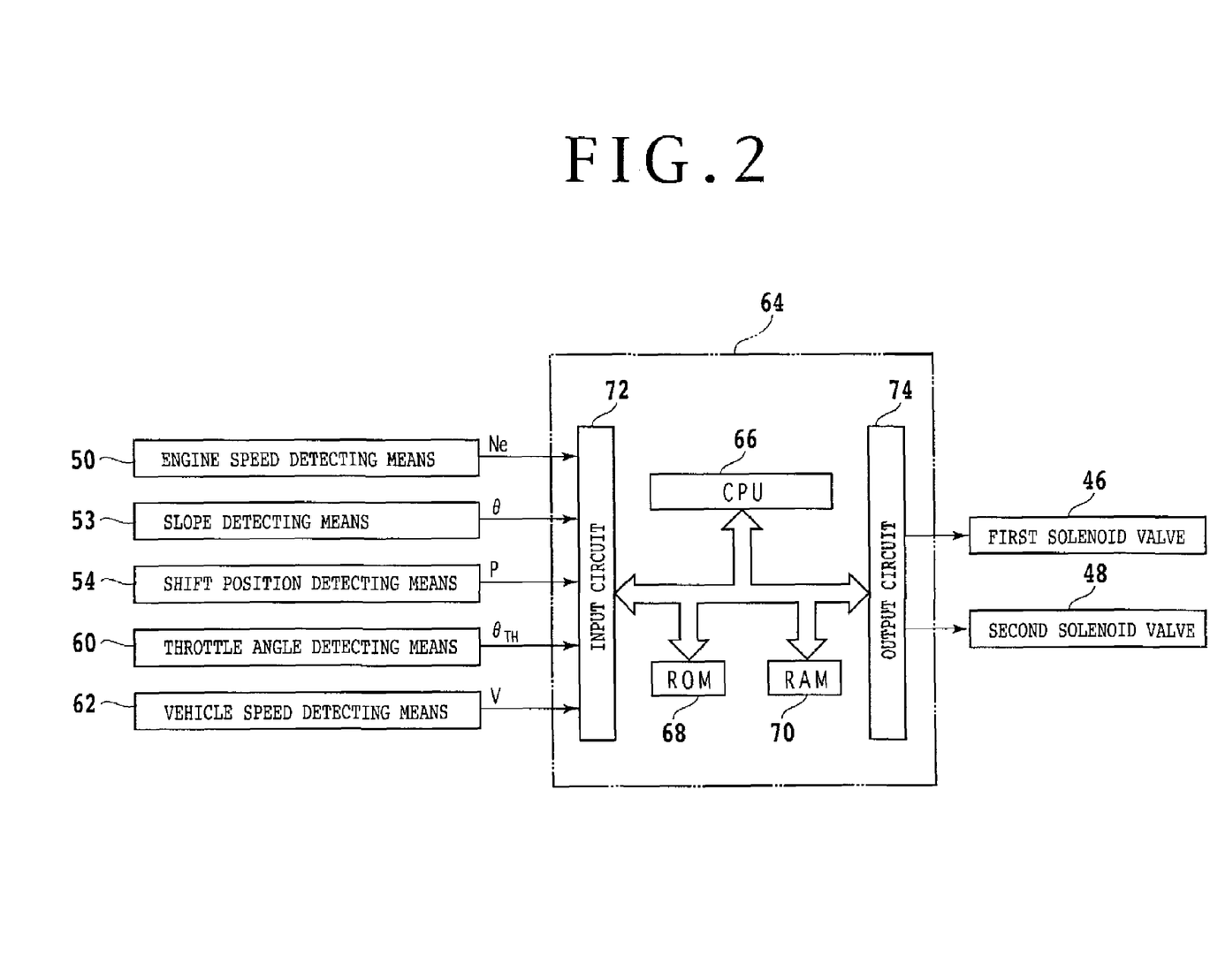
FIG. 2 is a block diagram of an electronic control unit.

FIG. 2 shows an electronic control unit (ECU) 64 for performing computations on output signals from the various detecting means mentioned above according to a control program and driving the first and second solenoid valves 46 and 48 to control the speed ratio of the torque converter 14. The electronic control unit 64 includes a central processing unit (CPU) 66 for performing the computations, a read only memory (ROM) 68 preliminarily storing the control program and data such as various tables, and a random access memory (RAM) 70 for temporarily storing the output signals from the various detecting means and the results of the computations.

The electronic control unit 64 further includes an input circuit 72 to which all of the engine speed detecting means 50, the slope detecting means 53, the shift position detecting means 54, the throttle angle detecting means 60, and the vehicle speed detecting means 62 are connected and also includes an output circuit 74 to which the first solenoid valve 46 and the second solenoid valve 48 are connected. Thus, the CPU 66 in the electronic control unit 64 performs computations on the various signals input through the input circuit 72 and on the data stored in the ROM 68 according to the control program to be hereinafter described, and controls the values of currents supplied through the output circuit 74 to the first and second solenoid valves 46 and 48. Accordingly, the engagement force of the lock-up clutch 24 can be changed to control the speed ratio of the torque converter 14.

The operation of the creep control device for the vehicle according to the present invention will now be described in detail with reference to the flowcharts shown in FIGS. 5 to 8. In step S10, it is determined whether or not the throttle angle is nearly zero. In other words, it is determined whether or not the depression force applied to an accelerator pedal has been removed. If the answer in step S10 is affirmative, the program proceeds to step S11, whereas if the answer in step S10 is negative, the program is ended. In step S11, it is determined whether or not the vehicle speed is less than or equal to a predetermined vehicle speed V0. The predetermined vehicle speed V0 is set to about 1 km/h, for example. In other words, in step S11, it is determined whether or not the vehicle is in a stopped condition or in a very slow running condition.

Figure 5:
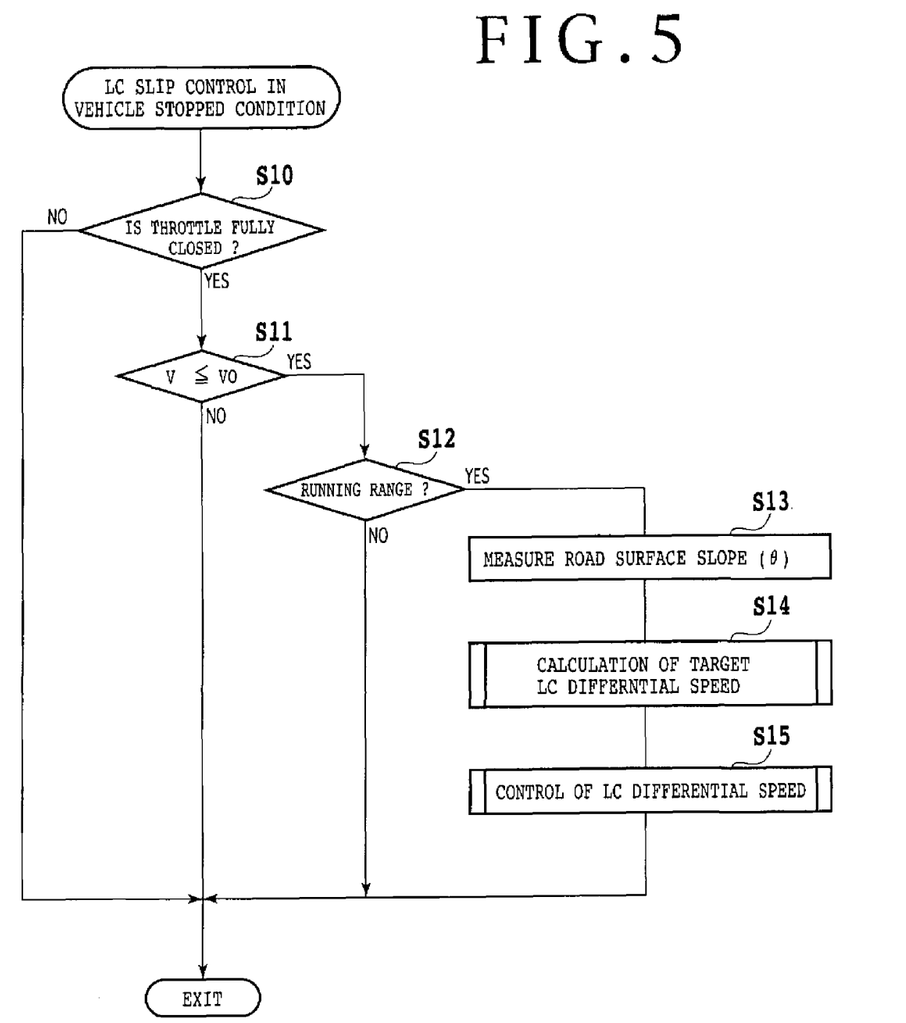
FIG. 5 is a flowchart showing the slip control of the lock-up clutch in the stopped condition of the vehicle.

If the answer in step S11 is affirmative, the program proceeds to step S12 to determine whether or not the present shift position is in a running range (D range or R range, for example) by receiving a detection signal from the shift position detecting means 54. If the present shift position is not in the running range (i.e., if the present shift position is in an N range or P range), the program is ended. If the present shift position is in the running range, the program proceeds to step S13 to detect a road surface slope θ by receiving a detection signal from the slope detecting means 53. Subsequently, the program proceeds to step S14 to calculate a target lock-up clutch differential speed $DN_{LCD}$ for producing a necessary and sufficient creep force according to the road surface slope θ. Subsequently, the program proceeds to step S15 to perform feedback control of the degree of engagement of the lock-up clutch, or the degree of slip of the lock-up clutch so that an actual lock-up clutch differential speed DNLCA becomes the target lock-up clutch differential speed $DN_{LCD}$ calculated in step S14.

Figure 6:
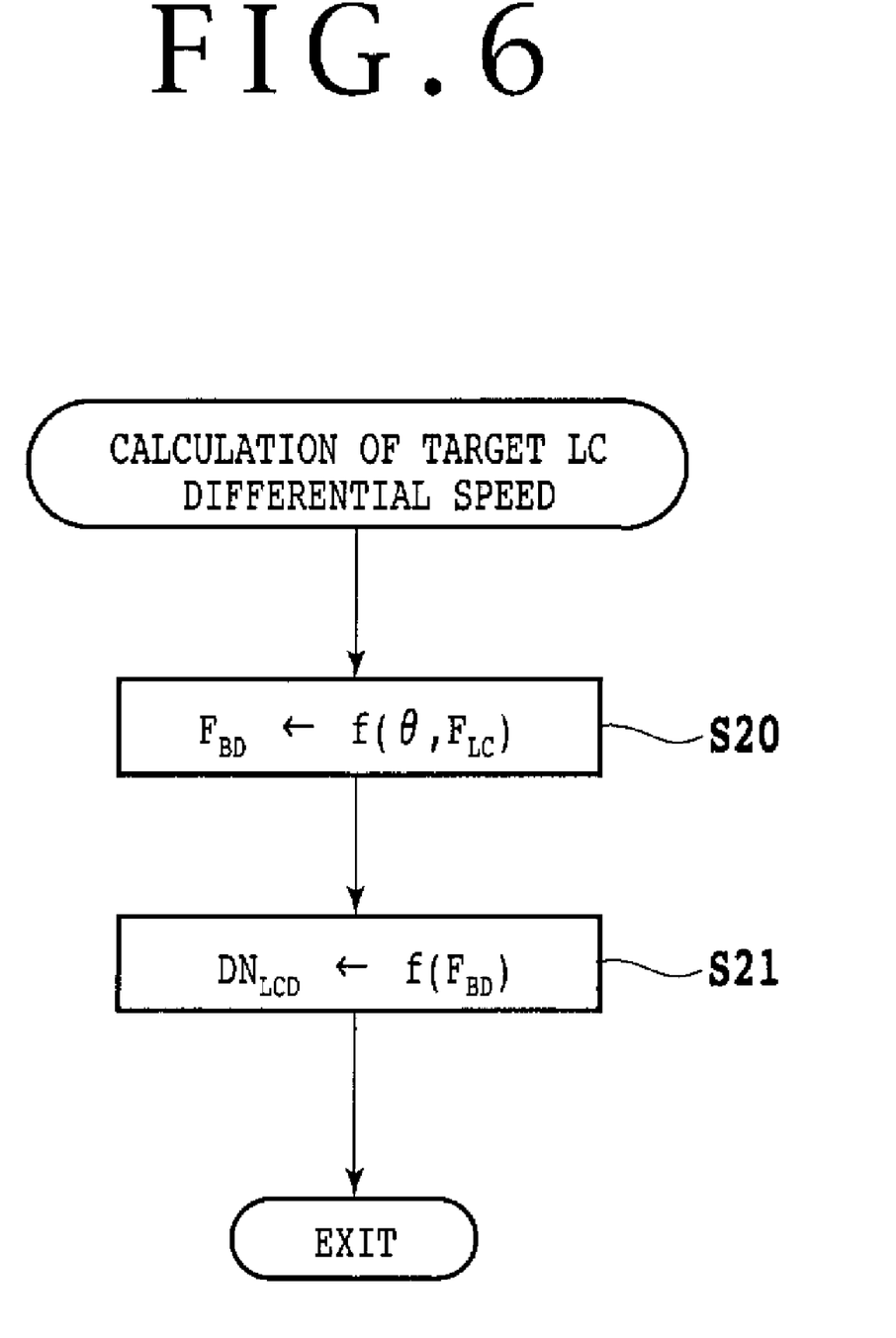
FIG. 6 is a flowchart showing the processing of calculating a target lock-up clutch differential speed.

The processing of calculating the target lock-up clutch differential speed in step S14 shown in FIG. 5 will now be described with reference to the flowchart shown in FIG. 6. In step S20, a required driving force $F_{BD}$ required for production of a required propelling force $F_{LC}$ set suitably is calculated according to the present road surface slope θ. The term of propelling force is defined as a force obtained by subtracting a running resistance from a driving force produced by the vehicle. Subsequently, the program proceeds to step S21 to calculate the target lock-up clutch differential speed $DN_{LCD}$ defined as a lock-up clutch differential speed required for production of the required driving force $F_{BD}$ in the condition where the throttle angle is constant. In the condition where the shift position is in the running range and the vehicle is kept stopped, the lock-up clutch differential speed is equal to the engine speed.

The processing of controlling the lock-up clutch differential speed in step S15 shown in FIG. 5 will now be described with reference to the flowchart shown in FIG. 7. In step S30, a linear solenoid current command value FF term (feedforward term) $I_{CMDFF}$ as a linear solenoid current for realizing the target lock-up clutch differential speed is calculated. In this preferred embodiment, the object to be directly controlled by the linear solenoid valve 48 is a clutch pressure in the lock-up clutch, i.e., a lock-up clutch capacity. When the lock-up clutch capacity is determined in the condition that the shift position is in the running range, that the vehicle is kept stopped, and that the throttle angle is constant (the throttle is in an almost fully closed condition), the lock-up clutch differential speed is also determined mechanically uniquely. Accordingly, the lock-up clutch differential speed can be controlled by the linear solenoid valve 48.

Subsequently, the program proceeds to step S31 to subtract the target lock-up clutch differential speed $DN_{LCD}$ from a lock-up clutch differential speed previous value $DN_{LCA\_PRE}$, thereby calculating a deviation $DN_{LCE}$ from the target value. Subsequently, the program proceeds to step S32 to calculate a linear solenoid current command value FB term (feedback term) $I_{CMDFB}$. In step S33, the linear solenoid current command value FB term $I_{CMDFB}$ is added to the linear solenoid current command value FF term $I_{CMDFF}$ to obtain a linear solenoid current command value $I_{CMD}$. Subsequently, the program proceeds to step S34 to perform current control (drive) of the linear solenoid valve 48.

Figure 8:
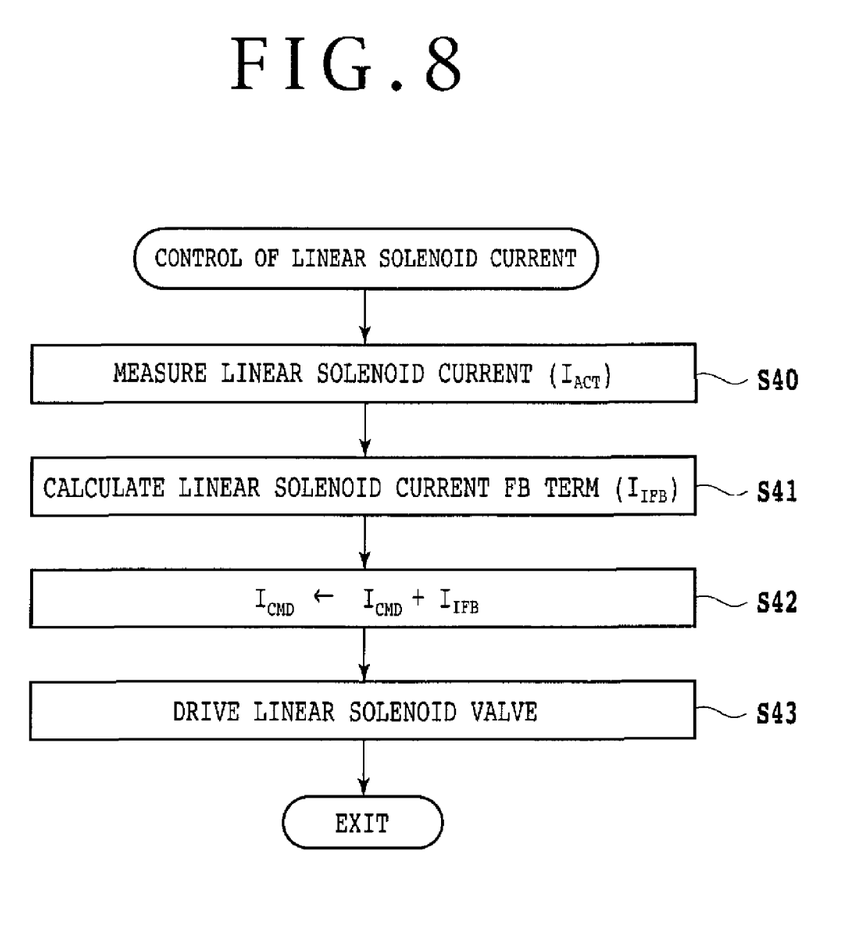
FIG. 8 is a flowchart showing the processing of controlling a current passing through a linear solenoid valve.

The current control of the linear solenoid valve 48 will now be described with reference to the flowchart shown in FIG. 8. In step S40, a current value $I_{ACT}$ in the linear solenoid valve 48 is measured. Subsequently, the program proceeds to step S41 to calculate a current feedback term $I_{IFB}$ for the current command value so that the linear solenoid actual current value $I_{ACT}$ becomes the linear solenoid current command value $I_{CMD}$. In step S42, the current feedback term $I_{IFB}$ is added to the linear solenoid current command value $I_{CMD}$ to obtain a linear solenoid current command value $I_{CMD'}$. In step S43, the linear solenoid valve 48 is driven according to the current command value $I_{CMD'}$ calculated in step S42.

Figure 7:
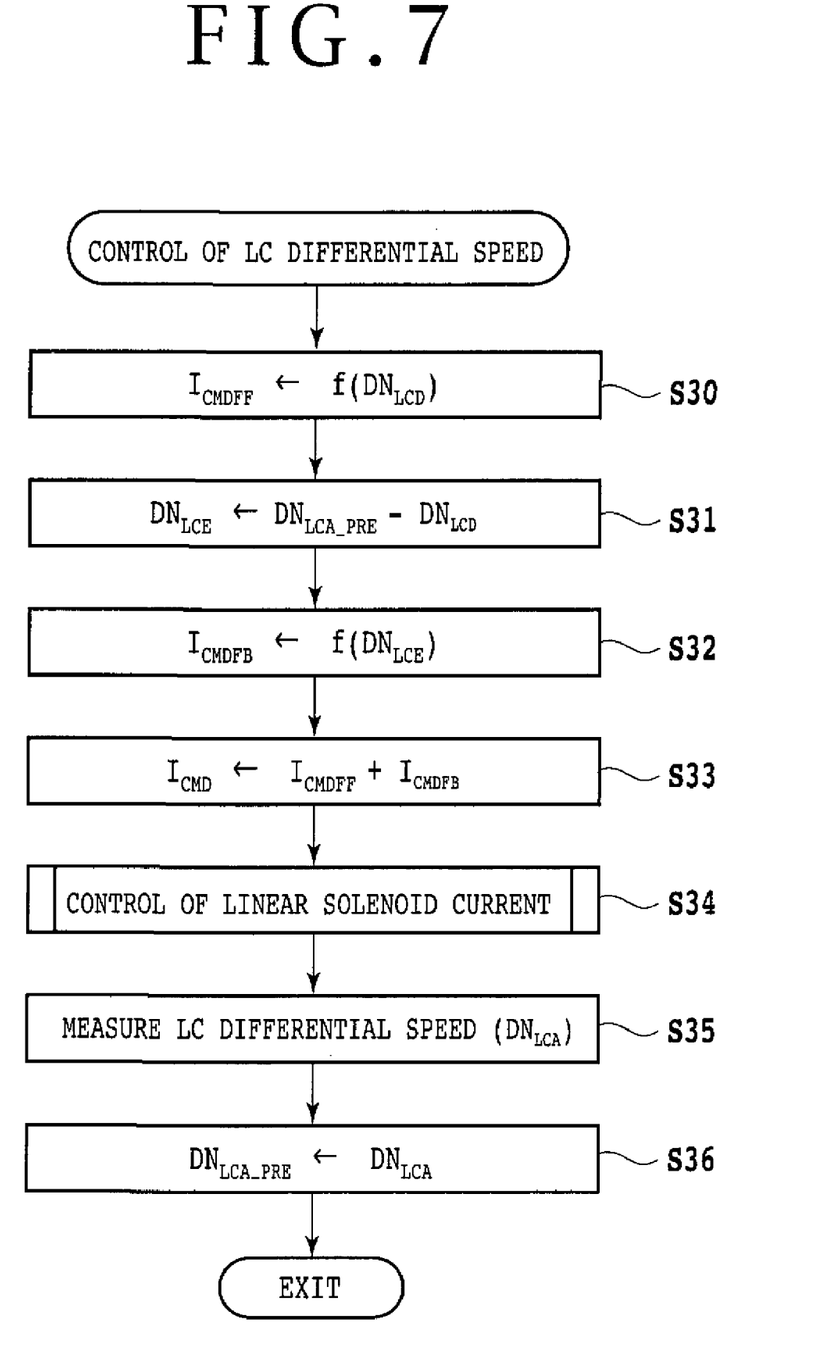
FIG. 7 is a flowchart showing the processing of controlling a lock-up clutch differential speed.

Thus, the linear solenoid valve 48 is driven in step S34 shown in FIG. 7. Thereafter, the program proceeds to step S35 to measure a lock-up clutch differential speed present value $DN_{LCA}$. In step S36, the lock-up clutch differential speed previous value $DN_{LCA\_PRE}$ is replaced by the lock-up clutch differential speed present value $DN_{LCA}$ obtained in step S35, and this program is ended. In the torque converter according to this preferred embodiment, the lock-up clutch capacity is proportional to the linear solenoid current value. Accordingly, the present value of the lock-up clutch capacity can be detected by detecting the linear solenoid actual current value.

A start driving force is controlled by the slip control of the lock-up clutch in the following manner. In the torque converter with the lock-up clutch, engine torque is transmitted through two routes to the automatic transmission. One of the two routes is a route where the input torque is transmitted by a hydraulic fluid with the amplification by the operation of the stator, and the other route is a route where the input torque is transmitted by the lock-up clutch according to an engagement pressure applied thereto. The torque to be input to the automatic transmission is the sum of the torques transmitted from the two routes, and the magnitude of the input torque changes with the distribution of the engine torque to these two routes. In the torque converter with the lock-up clutch, the distribution of the engine torque to the two routes can be arbitrarily set by controlling the engagement pressure applied to the lock-up clutch. Accordingly, the torque to be input to the automatic transmission can be arbitrarily changed to control the start driving force.

Figure 9:
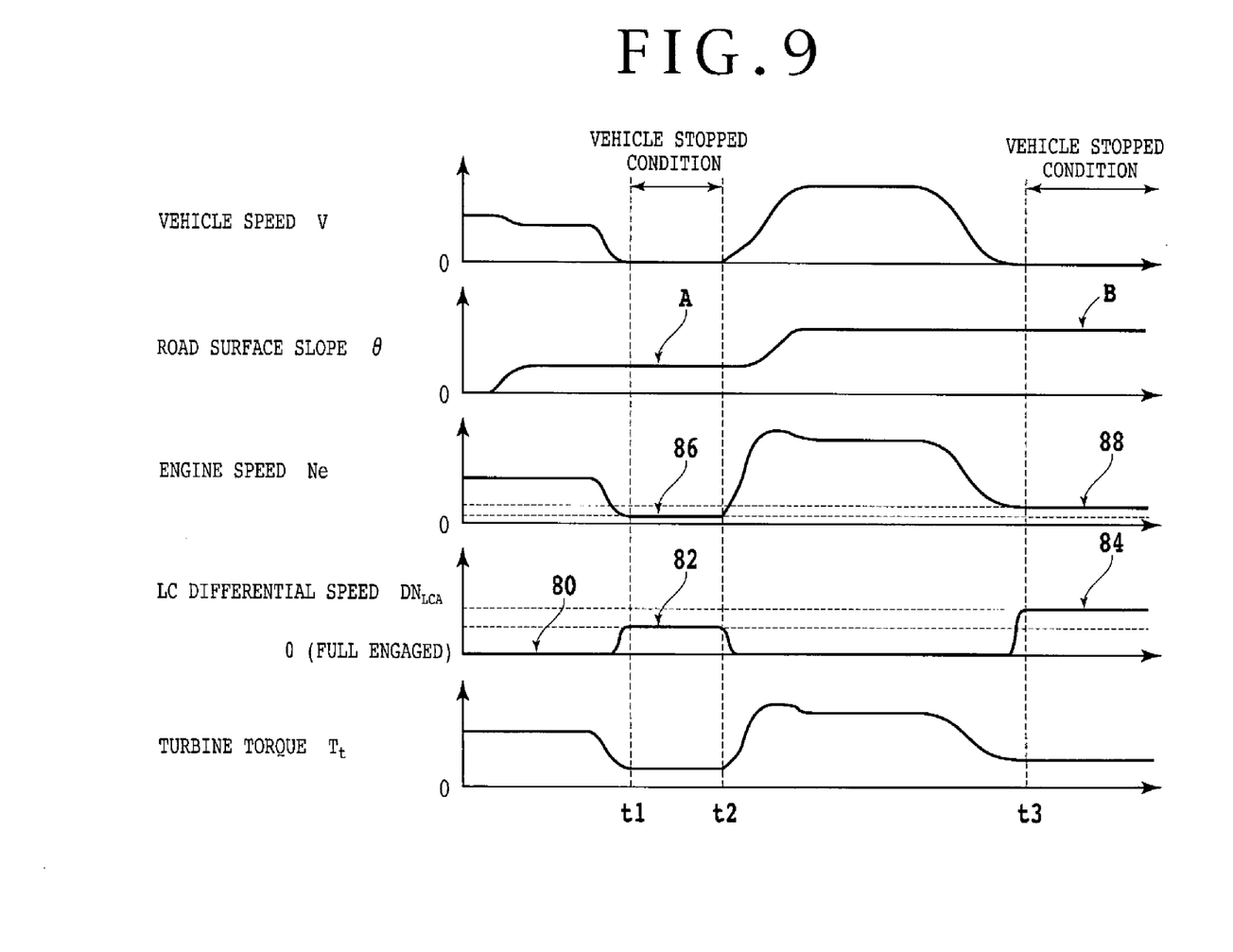
FIG. 9 is a time chart showing the creep control according to the present invention.

The creep control of the present invention will now be described in more detail with reference to the time chart shown in FIG. 9. When the lock-up clutch is in a fully engaged condition, the lock-up clutch differential speed is zero as shown by reference numeral 80. When the vehicle is in a stopped condition and the road surface slope is A, the lock-up clutch differential speed is controlled to a value as shown by reference numeral 82. When the road surface slope becomes B greater than A, the lock-up clutch differential speed is controlled to a value as shown by reference numeral 84, which value is greater than the value 82.

Thus, the lock-up clutch differential speed is controlled to increase with an increase in the road surface slope in the stopped condition of the vehicle. Since the creep force is increased with an increase in the lock-up clutch differential speed, a larger driving force can be produced on a road surface having a larger slope. Further, reference numerals 86 and 88 denote different engine idling speeds in the stopped condition of the vehicle, which show that the larger the engine torque transmitted through the lock-up clutch, the smaller the engine output during idling, so that the fuel economy can be improved.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A creep control device for a vehicle having an automatic transmission including a torque converter with a lock-up clutch, said creep control device comprising:
   throttle angle detecting means for detecting a throttle angle;
   vehicle speed detecting means for detecting a running speed of said vehicle;
   slope detecting means for detecting a road surface slope; and
   lock-up clutch engagement control means for controlling a degree of engagement of said lock-up clutch to decrease with an increase in said road surface slope while maintaining engagement of said lock-up clutch in its slip condition, when said throttle angle is detected to be nearly zero by said throttle angle detecting means and said running speed is detected to be very small or zero by said vehicle speed detecting means in a condition where a shift position is in a running range.

2. A creep control method for a vehicle having an automatic transmission including a torque converter with a lock-up clutch, said creep control method comprising:
   detecting a throttle angle;
   detecting a running speed of said vehicle;
   detecting a road surface slope; and
   controlling a degree of engagement of said lock-up clutch to decrease with an increase in said road surface slope while maintaining engagement of said lock-up clutch in its slip condition, when said throttle angle is detected to be nearly zero and running speed is detected to be very small or zero in a condition where a shift position is in a running range.

* * * * *